(12) United States Patent
Føhraeus et al.

(10) Patent No.: US 8,692,807 B2
(45) Date of Patent: Apr. 8, 2014

(54) TOUCH SURFACE WITH A COMPENSATED SIGNAL PROFILE

(75) Inventors: Christer Føhraeus, Bjärred (SE); Tomas Christiansson, Torna-Hällestad (SE); Henrik Wall, Dalby (SE); Ola Wassvik, Brösarp (SE)

(73) Assignee: Flatfrog Laboratories AB, Lund (SE)

( * ) Notice: Subject to any disclaimer, the term of this patent is extended or adjusted under 35 U.S.C. 154(b) by 175 days.

(21) Appl. No.: 13/393,764

(22) PCT Filed: Sep. 1, 2010

(86) PCT No.: PCT/SE2010/050932
§ 371 (c)(1),
(2), (4) Date: Mar. 1, 2012

(87) PCT Pub. No.: WO2011/028169
PCT Pub. Date: Mar. 10, 2011

(65) Prior Publication Data
US 2012/0162144 A1 Jun. 28, 2012

Related U.S. Application Data

(60) Provisional application No. 61/272,219, filed on Sep. 2, 2009, provisional application No. 61/272,666, filed on Oct. 19, 2009.

(30) Foreign Application Priority Data

Sep. 2, 2009 (SE) ........................................ 0950628
Oct. 19, 2009 (SE) ........................................ 0950767

(51) Int. Cl.
*G06F 3/042* (2006.01)

(52) U.S. Cl.
USPC .......................... 345/175; 345/173; 178/18.09

(58) Field of Classification Search
CPC .... G06F 3/0304; G06F 3/033; G06F 3/03547; G06F 3/041; G06F 3/042
USPC ............... 345/175, 173, 176, 179; 178/18.01, 178/18.09, 18.11; 250/221
See application file for complete search history.

(56) References Cited

U.S. PATENT DOCUMENTS 3,673,327 A 6/1972 Johnson et al.
4,254,333 A 3/1981 Bergstrom
(Continued)

FOREIGN PATENT DOCUMENTS

WO WO 2009/048365 4/2009
WO WO 2010/006882 1/2010
(Continued)

*Primary Examiner* — Joe H Cheng
(74) *Attorney, Agent, or Firm* — Harness, Dickey & Pierce, P.L.C.

(57) ABSTRACT

An apparatus, method and computer-readable medium for determining a location of at least one object on a touch surface of a light transmissive panel. The method comprises the steps of: introducing light into the panel for propagation by internal reflection between the touch surface and an opposite surface; receiving the light propagating in the panel; and iteratively i) determining a current signal profile of light received by the light detection arrangement, ii) updating, when a condition is met, a background signal profile of light received by the light detection arrangement, iii) calculating a current compensated signal profile as a function of the background signal profile and the current signal profile and iv) determining, when the object touches the touch surface and thereby attenuates the light propagating in the panel, the location as a function of the compensated signal profile.

26 Claims, 9 Drawing Sheets

(56) References Cited

U.S. PATENT DOCUMENTS

| | | | |
|---|---|---|---|
| 6,784,948 B2 * | 8/2004 | Kawashima et al. | 349/12 |
| 6,972,753 B1 | 12/2005 | Kimura et al. | |
| 7,432,893 B2 | 10/2008 | Ma et al. | |
| 7,465,914 B2 * | 12/2008 | Eliasson et al. | 250/221 |
| 7,995,039 B2 * | 8/2011 | Eliasson et al. | 345/173 |
| 8,350,827 B2 * | 1/2013 | Chung et al. | 345/175 |
| 2003/0034439 A1 * | 2/2003 | Reime et al. | 250/221 |
| 2004/0252091 A1 | 12/2004 | Ma et al. | |
| 2006/0114237 A1 | 6/2006 | Crockett et al. | |
| 2007/0075648 A1 | 4/2007 | Blythe et al. | |
| 2009/0073142 A1 * | 3/2009 | Yamashita et al. | 345/176 |
| 2009/0128508 A1 * | 5/2009 | Sohn et al. | 345/173 |
| 2009/0168459 A1 * | 7/2009 | Holman et al. | 362/623 |
| 2009/0267919 A1 * | 10/2009 | Chao et al. | 345/175 |
| 2009/0273794 A1 * | 11/2009 | Ostergaard et al. | 356/614 |
| 2011/0069039 A1 * | 3/2011 | Lee et al. | 345/176 |
| 2011/0090176 A1 * | 4/2011 | Christiansson et al. | 345/175 |
| 2011/0227874 A1 * | 9/2011 | Fahraeus et al. | 345/175 |
| 2012/0200538 A1 * | 8/2012 | Christiansson et al. | 345/175 |
| 2013/0181896 A1 * | 7/2013 | Gruhlke et al. | 345/156 |

FOREIGN PATENT DOCUMENTS

| | | |
|---|---|---|
| WO | WO 2010/006883 | 1/2010 |
| WO | WO 2010/006884 | 1/2010 |
| WO | WO 2010/006885 | 1/2010 |
| WO | WO 2010/006886 | 1/2010 |
| WO | WO 2010/134865 | 11/2010 |

* cited by examiner

TOUCH SURFACE WITH A COMPENSATED SIGNAL PROFILE

CROSS-REFERENCE TO RELATED APPLICATIONS

The present application claims the benefit of Swedish patent application No. 0950628-8, filed 2 Sep. 2009, U.S. provisional application No. 61/272,219, filed 2 Sep. 2009, Swedish patent application No. 0950767-4, filed 19 Oct. 2009, and U.S. provisional application No. 61/272,666, filed 19 Oct. 2009, which all are incorporated by reference.

TECHNICAL FIELD

The invention relates to techniques for detecting the location of an object on a touch surface. The touch surface may be part of a touch-sensitive panel.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc. into the panel.

US2004/0252091 discloses an alternative, touch-sensing technique which is based on frustrated total internal reflection (FTIR). Diverging beams from two spaced-apart light sources is coupled into a panel to propagate inside the panel by total internal reflection. The light from each light source is evenly distributed throughout the entire panel. Arrays of light sensors are located around the perimeter of the panel to detect the light from the light sources. When an object comes into contact with a surface of the panel, the light will be locally attenuated at the point of touch. The location of the object is determined by triangulation based on the attenuation of the light from each source at the array of light sensors.

U.S. Pat. No. 3,673,327 discloses a similar touch-sensing technique in which arrays of light beam transmitters are placed along two edges of a panel to set up a grid of intersecting light beams that propagate through the panel by internal reflection. Corresponding arrays of beam detectors are placed at the opposite edges of the panel. When an object touches a surface of the panel, the beams that intersect at the point of touch will be attenuated. The attenuated beams on the arrays of detectors directly identify the location of the object.

These known FTIR techniques suffer from being costly, i.a. since they require the use of a relatively complex devices for measuring the light with such an accuracy that it is possible to satisfactory differentiate objects touching the panel from other, irrelevant objects possibly present on the panel.

SUMMARY

In view of the foregoing, it is an object of the invention to provide an improvement of the above techniques and prior art. More particularly, it is an object to provide an apparatus with an improved resolution taking any irrelevant objects on the screen into account.

Hence an apparatus is provided for determining a location of at least one object on a touch surface, the apparatus comprising: a light transmissive panel defining the touch surface and an opposite surface; an illumination arrangement configured to introduce light into the panel for propagation by internal reflection between the touch surface and the opposite surface; a light detection arrangement configured to receive the light propagating in the panel; and a processor unit configured to iteratively i) determine a current signal profile of light received by the light detection arrangement, ii) update, when a condition is met, a background signal profile of light received by the light detection arrangement, iii) calculate a current compensated signal profile as a function of the background signal profile and the current signal profile, and iv) determine, when the object touches the touch surface and thereby attenuates the light propagating in the panel, the location as a function of the compensated signal profile.

In this context it should be noted that many various techniques for introducing light in the panel as well as techniques for receiving the light exist. This means that the inventive apparatus may use any suitable light introducing/light receiving technique, as the core of the invention lies in how the processor unit can be arranged to process various signal profiles used for determining the location of the object. Here, a "signal profile" can represent the energy of the light received (and implicitly measured) by use of the light detection arrangement. Thus, the illumination arrangement introduces light at an incoupling site of the panel while the light detection arrangement detects light at an outcoupling site of the panel. Accordingly, a signal profile represents the received energy at different spatial locations within the outcoupling site. Here, the current signal profile may be referred to as a current projection signal, the background signal profile may be referred to as a background projection signal, and the compensated signal profile may be referred to as a compensated projection signal.

Updating the background signal profile of light received by the light detection arrangement does not mean that the background signal profile must be updated during each iteration performed by the processor unit, but rather that the background signal profile is determined based on light that, at some previous or at a current point of time, was received by the light detection arrangement.

An advantage of the invention may lie in a reduced impact of e.g. contaminations and damages/imperfections of the touch surface when determining the location of the object; by intermittently updating the background signal profile, signal features originating for contaminations/damages/imperfections will be automatically suppressed or even eliminated in the compensated signal profile. As a result, a more accurate determination of the location of the object can be obtained by comparatively simple and efficient data processing. Moreover, the inventive apparatus is particularly suitable when the determining of the location of the object is based on attenuation of light and the hence relatively complex current signal profile of the received light. In particular, in case the internal reflections in the panel are caused by total (or almost total) internal reflection (TIR) and the touch of the object causes FTIR, the apparatus has been found surprisingly promising in respect of efficiently processing the obtained signal profiles.

The apparatus is also suitable for handling situations where contaminations are removed from the touch surface, which typically results in a decreased attenuation at the location of the removed contamination. In this case the updating of the background signal profile can be seen as "negative" in comparison with the situation when contamination is added to the touch surface.

The processor unit can be seen as means for performing the iterative process and, during the iterative process, means for determining the current signal profile, updating the background signal profile, calculating the compensated signal profile and determining the location of the object. Also, as the skilled person realizes, the processor unit can comprise one or more data processors which each performs one or more of the described processing operations.

As indicated, the processor unit performs an iterative operation for determining the location of the object touching the touch surface. Moreover, the iteration can be continuously performed irrespectively if the object touches the touch surface. Also, operations of the processor unit may be performed in a different order than described, may be combined and may be divided into sub-operations. Furthermore, additional operations may be performed by the processor unit and certain operations can be performed only when the processor unit determines that an object touches the touch surface.

Here, light is referred to as electromagnetic radiation with a wavelength selected within the range of 10 nm to 1 mm, i.e. both ultraviolet, visible and infra-red light can be used for the detection of the location of the object, though infra-red light is often the most preferable light.

The processor unit may be configured to calculate the compensated signal profile by dividing the current signal profile with the background signal profile. By configuring the processor unit in this manner the compensated signal profile can be seen as a so-called transmission signal. The transmission signal can have an essentially uniform signal level at a (relative) transmission of about one with a local decline in the signal profile when the object touches the touch surface.

It is to be understood that the conversion of current signal profiles into transmission signals may greatly facilitate the identification of relevant signal declines indicative of touches. Thus, by converting the current signal profiles into transmission signals by using a dividing operation, it is possible to separate the contribution from individual touching objects to a local decline in a transmission signal.

As the skilled person realizes, a processor unit configured to calculate the compensated signal profile by dividing is not limited to calculate the compensated signal profile by division only, but other, mathematically corresponding operations may be performed as well. Of course, the same applies for the below described operations of subtracting logarithms of the signal profiles as well as subtracting the signal profile per se, even though the latter does not result in a transmission signal but rather in an absolute difference in signal levels.

The processor unit may be configured to calculate the compensated signal profile by subtracting the logarithm of the background signal profile from the logarithm of the current signal profile.

When calculating the compensated signal profile by subtraction of the logarithm of the background signal profile from the logarithm of the current signal profile, the same effect as the operation of dividing described above is achieved but at a reduced computational cost since a subtraction operation generally is a more processing-efficient operation than a division. Moreover, for further reducing the required computational effort, the determining of a logarithm of a certain value can be based on looking up the value and its logarithm in a table. In this case, the compensated signal profile corresponds to the logarithm of the transmission signal described above.

The processor unit may be configured to calculate the compensated signal profile by subtracting the background signal profile from the current signal profile.

When using subtraction in this manner, the compensated signal profile can be seen as a change in transmission signal and can be used for identifying reduced signal levels indicative of touches.

The processor unit may be configured to determine the location by subtracting a previously determined compensated signal profile from the compensated signal profile.

Each of the signal profiles may comprise a respective signal profile of a first main direction of the panel and a respective signal profile of a second main direction of the panel. Accordingly, at least four signal profiles that represent main directions of the panel can be used for determining the location of the object, and the calculation of the current compensated signal profile can accordingly include two operations of the above described dividing/subtracting. The four signal profiles typically represent, in case a Cartesian coordinate system is used for defining the location of the object, the x- and y-components of the respective background signal profile and current signal profile.

The illumination arrangement may comprise a set of light emitters for introducing the light and the light detection arrangement may comprise a set of light detectors for receiving the light, wherein the light for forming the background signal profile and the light for forming the current signal profile is introduced and received at a respective time by the same sets of light emitters and light detectors. Here, the "set of" detectors/emitters may include only one detector/emitter.

The processor unit may be configured to update the background signal profile independent of a presence of the object on the touch surface. Accordingly, this may mean that the light used for forming the background signal profile is measured by the light detection arrangement irrespectively of any touch by the object on the touch surface, and that the processor unit continuously may perform the iterative operation that include the updating of the background signal.

The processor unit may be configured to update the background signal profile when the object touches the touch surface and thereby attenuates the light propagating in the panel. In this case the background signal in fact is updated when the object touches the touch surface. However, it does not necessarily mean that this updating (when object touches the surface) is triggered by the touch, even if it is possible. For the apparatus, it can be decided that the object touches the touch surface when the object's location on the touch surface can be determined.

The processor unit may be configured to update the background signal profile when the apparatus is initiated. Typically the initiation can be included in a conventional start-up process of the apparatus. In one version the processor unit can also be configured to update the background signal profile in response to a user command such as a reset-command or an auto-adjust command of a graphical display device on which the touch panel is arranged. For example, the user command may be indicated to the processor unit by a touch being determined at a given location on the touch surface.

The processor unit may be configured to update the background signal profile at predetermined time intervals. By using certain time intervals the background signal can by coincidence be updated e.g. when an object touches the touch surface. The time interval can here be dynamic, such as decreased when a relatively large number of touches on the touch surface can be determined over a period of time. In a corresponding manner the time interval can be increased when a relatively small number of objects are touching the touch surface. The time interval can be e.g. every four seconds, each iteration or every 10:th iteration performed by the processor unit etc.

The processor unit may be configured to update the background signal profile when the processor unit determines that no object touches the touch surface. This criterion for updating the background signal profile can be combined with e.g. the criterion of updating the background signal profile when the object touches the touch surface even though these criteria may seem conflicting. For example, after updating the background signal a certain number of times when no object touches the touch surface, it can be decided that the background signal shall be updated as soon as an object touches the touch surface. In the latter case, the updating can be triggered by the detection of an object, e.g. when the location of an object was determined in a previous iteration.

The processor unit may be configured to update the background signal profile as a function of a currently measured signal profile and a previously updated background signal profile. By doing so, it is possible to e.g. remove peaks of the signal profile caused by contaminants or scratches on the touch surface. The previously updated background signal profile may comprise any earlier updated background signal profile, i.e. it must not be the most recently updated background signal profile.

The processor unit may be configured to update the background signal profile by weighting a currently measured signal profile relatively lower than a previously updated background signal profile, which gives a possibility to discard contaminants on the touch surface and/or signal peaks resulting from touches that linger on the touch surface over several iterations. An example of weighting can include weighting the currently measured signal profile with 0.01%-1% while weighting the previously updated background signal profile with 99%-99.99%. Preferably, when the background signal profile is updated more frequently a relatively lower weight is given the currently measured signal.

The processor unit may be configured to update a first section of the background signal profile differently from a second section of the background signal profile. The sections can here be indicative of a light distribution in the panel at different locations, which can be useful as different parts of the panel often are more or less frequently used. Based on this understanding and bearing in mind that the signal profile can indicate the spatial distribution of light propagating in the panel, the need of updating the background signal profile is in practice often different for different parts of the signal profile.

The processor unit may be configured to update a first section of the background signal profile indicative of the location of the object differently from a second section of the background signal profile not indicative of the location of the object. Here, "not indicative" of a location can be seen as a part of the background signal profile that corresponds to a part of the current or compensated signal profile for which no location of the object can be determined.

Updating two sections of the signal profile differently can, for example, comprise updating one of the sections while the other section is not updated, updating the sections at different time intervals and/or using different calculations for the updating of the respective section.

The processor unit may be configured to update the background signal profile by determining the background signal profile as a function of the location of the object. The location of the object is typically determined by a certain section of the current or compensated signal profile, and this section can be mapped with the background signal profile. Once the mapping is done the corresponding section of the background signal profile indicative of the touch can be updated in a certain way.

The processor unit may be configured to update the background signal profile by determining the background signal profile as a function of time passed since the location of the object was determined. For example, this can comprise setting the background signal profile to a signal profile obtained during previous measurements of the intensity of light. When using such a delayed background signal profile the effect of e.g. distorted touches can be compensated before their effect is included in the compensated signal profile.

The processor unit may be configured to, when the object is removed from the touch surface, update a first section of the background signal profile associated with the location of the object faster than a second section of the background signal profile not associated with the location of the object. Updating faster comprises updating more frequently (more often in time) as well as e.g. applying a relatively higher weight factor to a more recent measurement signal profile than to a previous background signal profile, which signal profiles are used in combination for determining the first section. This means that a section of the background signal profile that previously spatially corresponded to a touch can be updated more often than other parts of the background signal previously not corresponding to a touch. After a certain number of updating iterations from when the touch was removed, the first section may be updated at same time intervals, or at the same rate, as other parts of the signal profile, i.e. the first section may then be treated in the same manner as any other section of the signal profile not corresponding to a touch.

Updating in this manner is advantageous in that signal features commonly resulting from e.g. fingerprints remaining on the locations of previous touches can be included in the background signal relatively fast.

The processor unit may be configured to update the background signal profile as a function of a time-distributed variation of light received by the light detection arrangement. Here, the variation can indicate a touch of an object, for example when the time-distributed variation has a certain slope over the time or if the time-distributed variation has a certain ripple. Once a touch is determined this information can be used for differentiating a touch from contaminants or damages on the touch surface, e.g. when updating the background signal profile as a function of the touch.

The processor unit may be configured to update the background signal profile as a function of the location of the object determined over a specific time interval. For example, if a part of the current signal profile has a shape that usually corresponds to a touch, but the "touch" has remained for a very long period of time such as 3 hours, the corresponding part of the background signal profile can be treated as if it is related to a contamination and can be updated accordingly.

The apparatus may comprise a memory unit configured to store data indicative of the presence of at least one object on the touch surface, and the processor unit may be configured to update the background signal profile as a function of the presence of the at least one object.

The processor unit may be further configured to determine the location of the object as a function of a previously determined compensated signal profile.

According to another aspect of the invention a method is provided for determining a location of at least one object on a touch surface of a light transmissive panel defining the touch surface and an opposite surface, the method comprising the steps of: introducing light into the panel for propagation by internal reflection between the touch surface and the opposite surface; receiving the light propagating in the panel; and iteratively i) determining a current signal profile of light received by the light detection arrangement, ii) updating, when a condition is met, a background signal profile of light received by the light detection arrangement, iii) calculating a current compensated signal profile as a function of the background signal profile and the current signal profile, and iv) determining, when the object touches the touch surface and thereby attenuates the light propagating in the panel, the location as a function of the compensated signal profile.

According to an alternative aspect, a method as described above is provided, with the difference that the step of introducing and receiving light is omitted. In this case the method may be implemented in the form of processing instructions that may be downloaded into a memory of e.g. a touch apparatus, which then can use the instructions for updating a background signal profile and/or for determining a location of a touch.

According to a further aspect of the invention, a computer-readable medium is provided for storing processing instructions that, when executed by a processing unit, performs any of the methods described above.

The inventive method may include functionality implementing any of the features described above in association with the inventive apparatus and shares the corresponding advantages, i.e. the method may include a number of steps corresponding to the above described operations of the processor unit.

BRIEF DESCRIPTION OF THE DRAWINGS

Embodiments of the invention will now be described, by way of example, with reference to the accompanying schematic drawings, in which.

DETAILED DESCRIPTION

Figure 1:
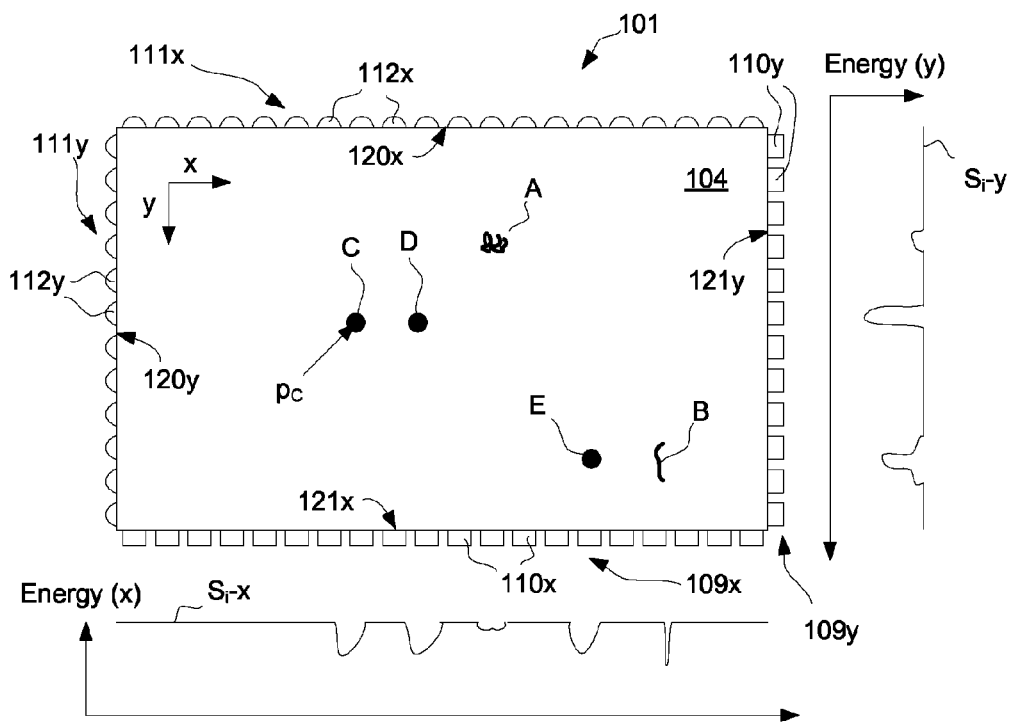
FIG. 1 is a top plan view of an embodiment of a touch sensing apparatus.
Figure 2:
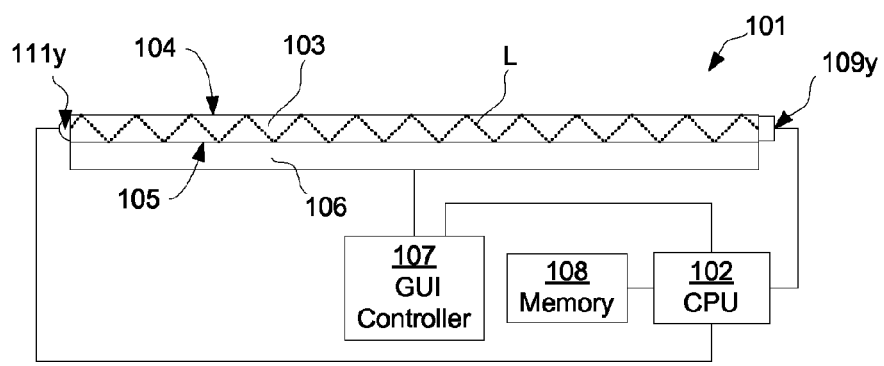
FIG. 2 is a cross-sectional view of FIG. 1.

FIGS. 1-2 illustrate an embodiment of a touch-sensing apparatus 101 that includes a light transmissive panel 103. The panel 103 may be planar or curved and defines a touch surface 104 and an opposite surface 105 opposite and generally parallel with the touch surface 104. The panel 103 is configured to allow light L to propagate inside the panel 103 by internal reflection and can have the shape of e.g. a rectangular, circular and elliptical plane.

Hence, a light propagation channel is provided between the touch surface 104 and the opposite surface 105 which in combination form two boundary surfaces of the panel 103. The touch surface 104 allows the propagating light L to interact with one or more touching objects (three objects C, D, E are shown) in the form of e.g. a finger or stylus. A contamination on the touch surface 104 in the form of a fingerprint A as well as a damage on the touch surface 104 in form of a scratch B are also illustrated. Here, the damage B can be referred to as a contamination.

In the interaction with an object, part of the light L may be scattered by the object, part of the light L may be absorbed by the object and part of the light may continue to propagate unaffected. Thus, when any of the objects C, D, E touches the touch surface 104 the energy of the transmitted light L is decreased. By measuring the energy of the light L transmitted through the panel 103 from a plurality (more than one) of different directions, the location of the touching object ("touch location") may be detected, e.g. by triangulation. As an example of a location, the location of object C is indicated by the reference symbol $p_C$.

However, just like the objects C, D, E, the contaminations A, B can cause part of the light L to be scattered as well as cause part of the light L to be absorbed. Accordingly, when detecting the location of a touching object based on the energy of light transmitted through the panel 103, contaminations can cause problems.

In FIG. 1, a Cartesian coordinate system has been introduced, with the coordinate axes x, y being parallel to the sides of panel 103 which in this embodiment has a rectangular shape. The Cartesian coordinate system is only for the purpose of illustration, for example when describing the location $p_C$ of the object C in terms of x- and y-coordinates and when describing various directions in relation to an x- and y-direction in the panel 103. The touch locations and directions can be represented in any type of coordinate system, such as a polar, elliptic, parabolic coordinate system.

Typically, the panel 103 is made of solid material in one or more layers. The internal reflections in the touch surface 104 are caused by internal reflection or total internal reflection (TIR), resulting from a difference in refractive index between the material of the panel 103 and the surrounding medium which typically is air. The reflections in the opposite boundary surface 105 may be caused either by TIR or by a reflective coating applied to the opposite boundary surface 105. TIR is sustained as long as the light L is injected into the panel 103 at an angle to the normal of the panel which is larger than the critical angle at the injection site of the panel. The critical angle is governed by the refractive indices of the material receiving the light at the injection site and the surrounding material, as is well-known to the skilled person.

The above-mentioned process of interaction between the touching object and the propagating light L may involve so-called frustrated total internal reflection (FTIR), in which energy is dissipated into the object from an evanescent wave formed by the propagating light, provided that the object has a higher refractive index than the material surrounding the panel surface material and is placed within less than several wavelengths distance from the surface 104. Generally, the panel 103 may be made of any material that transmits a sufficient amount of light in the relevant wavelength range to permit a sensible measurement of transmitted energy. Such material includes glass and polycarbonates. The panel 103 is defined by a circumferential edge portion, which may or may not be perpendicular to the top and bottom surfaces 104, 105.

The light L may be coupled into the panel 103 via one or more incoupling sites 120x, 120y of the panel 103 and coupled out of the panel 103 via one or more outcoupling sites 121x, 121y. For example and as shown in FIGS. 1 and 2, the light L may be coupled into (be introduced into) the panel 103 by a first illumination arrangement 111x that couples the light L into the panel 103 for propagation in the y-direction and by a second illumination arrangement 111y that couples light into the panel 103 for propagation in the x-direction. The light propagated in the y-direction is coupled out at (received by) a first light detection arrangement 109x while the light propagated in the x-direction is coupled out at a second light detection arrangement 109y. The light detection arrangements can each measure the energy of the light at the respective outcoupling site.

Each of the illumination arrangements 111x, 111y has a respective set of light emitters 112x, 112y while each of the light detection arrangement 109x, 109y has a respective set of light detectors 110x, 110y. Each of the light emitters emits light in the form of a beam that is received by an opposite detector of the detectors, such that the full panel 103 is illuminated. The light introduced at the incoupling sites creates sheets of light in a respective of the directions x and y, while light is detected at the outcoupling sites at different spatial locations along the length of the respective outcoupling site.

It should be noted that there are numerous other ways for coupling light into and coupling light out from the panel 103 that just as well might be used. Accordingly, in its most general definition the panel 103 can bee seen as having the incoupling sites 120x, 120y for introducing the light and the outcoupling sites 121x, 121y for coupling light out from the panel 103. This includes the possibility to couple the light into and out of the panel 103 directly via the edge portion. Alternatively, a separate elongate coupling element may be attached to the edge portion or to the top or bottom surface 104, 105 to lead the light into or out of the panel 103. Such a coupling element may have the shape of e.g. a wedge. Also, the incoupling site may be only a small point at an edge or corner of the panel 103, and depending on the specific in/outcoupling technique used the light may be propagated in the panel 103 as substantially straight beams, as diverging/converging/collimated beams, as coded beams using multiplexing etc.

The detectors continuously measure or sample the energy of light received at the outcoupling site, resulting in a signal profile which represents the received energy at different spatial locations within the outcoupling site. For performing operations on the signal profile a so-called "sensing instance" is formed during a small time interval, such that data representing the signal profile at the time interval can be retrieved. In this context, a number of subsequent sensing instances result in the same number of sets of data describing the signal profile at the outcoupling site and at different points in time. Hence, the sensing instance can be given by collecting a certain number of signal profiles, where each signal profile, as mentioned, represents the energy of light transmitted in the panel to a number of spatial positions at the outcoupling site, where each spatial position is associated with a specific path of light in the panel. Also, the illumination arrangement can be configured to introduce light that carries a multiplexed signal, in which case each spatial position at the outcoupling site can hold information about several paths of light.

The temporal resolution of the apparatus is determined by how frequent the signal profiles are retrieved. For example, for an apparatus designed for recording of handwriting, it may be desirable to have signal profile retrieval of at least 75 Hz (i.e. 75 sensing instances formed per second), whereas other applications may require a lower or higher temporal resolution. As will be described below, operations on the signal profiles may repeatedly be performed in an iterative manner, and when performing the iteration (repetitive operation), one sensing instance is used for each iteration. Accordingly, it can be said that an iterative operation may be performed for each momentary signal profile, sensing instance or iteration.

As implied above, the location $p_C$ of the touching object C can be determined if the object C affects at least two non-parallel beams emitted from a respective incoupling site. After passing the panel the energy of each beam is measured by opposite light detectors, which are optically coupled to the outcoupling site(s) of the panel 103.

The touch-sensing apparatus of FIG. 1 may be operated to determine the location of a plurality of objects touching the surface during a sensing instance ("multitouch"). As mentioned above, only part of the light is absorbed/scattered by an object, while the remaining light continues to propagate along the main direction of the beam passing the object. Thus, if two objects happen to be placed after each other in the direction of a beam, part of the beam will interact with both objects. Provided that the beam energy is sufficient, a remainder of the beam will reach the light detector and generate a measurement signal that allows both interactions to be identified.

In FIG. 1, the objects C, D are placed simultaneously (i.e. during one and the same sensing instance) on the panel 103, and measurement signal profiles $S_i$-x, $S_i$-y are generated by the light detector(s). The signal profiles $S_i$-x, $S_i$-y represent the measured energy of beams at the outcoupling sites of the panel 103 during sensing instance no. i. The signals indicate measured energy as a function of time and/or x-y position in the given coordinate system. As shown, each touching object C, D, E as well as contaminations A and B result in a respective local decrease in measured beam energy for each iteration. Specifically, the objects/contaminations are attributed to signal features which depend on the apparent size of the objects/contaminations where a signal feature depends on the absorptive/scattering properties of the objects/contaminations as well as the size of the objects/contaminations. Provided that the signal profiles $S_i$-x, $S_i$-y allow a processing unit (CPU) 102 to distinguish between the objects/contaminations, their location on the panel 103 can as mentioned be determined by e.g. triangulation.

Figure 3:
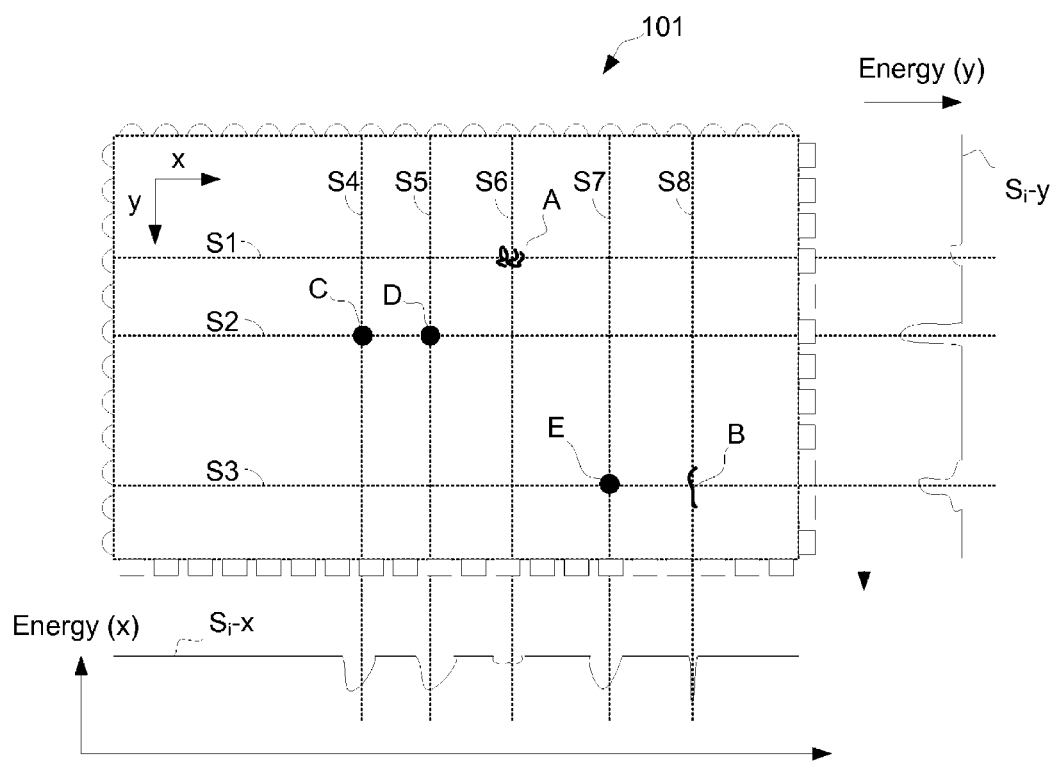
FIG. 3 illustrates measured energy of a number of beams propagating in the apparatus of FIG. 1.

With reference to FIG. 3 the measurement signal profiles $S_i$-x and $S_i$-y are described in more detail, where measurements S1-S8 represent the measured energy of a number of paths for which light is attenuated by the objects/contaminations. Accordingly, the aggregation of S1-S8 gives the peaks of the signal profiles $S_i$-x and $S_i$-y. Here, the measurements S1-S8 have a signal profile widths that correspond to the width of the caused attenuation as can be seen by the signal profiles $S_i$-x and $S_i$-y where, for example, the scratch B in the y-direction causes a wider profile in the y-direction than in the x-direction. As known within the art, the attenuation comprises absorption and/or scattering of the light in the panel and results in a decreased intensity of the light at the outcoupling site(s).

The processing unit 102 (FIG. 2) for distinguishing between the objects and contaminations can also be used for determining their location on the touch surface 104. For this purpose the processor unit 102 is connected to the light detection arrangements 109x, 109y such that the signal profiles $S_i$-x, $S_i$-y are retrieved by the processing unit 102. A computer-readable medium in the form of a memory unit 108 is connected to the processing unit 102 for allowing various signal profiles to be stored as well as for storing processing instructions which, when executed by the processing unit 102, performs any of the operations of the method described below.

In the example of FIGS. 1 and 2, the apparatus also includes an interface device 106 that provides a graphical user interface (GUI) within at least part of the panel surface 104. The interface device 106 may be in the form of a substrate with a fixed image that is arranged over, under or within the panel 103. Alternatively, the interface device 106 may be a screen arranged underneath or inside the apparatus 101, or a projector arranged underneath or above the apparatus 101 to project an image onto the panel 103. Such an interface device 106 may provide a dynamic GUI, similar to the GUI provided by a computer screen. The interface device 106 is controlled by a GUI controller that can determine where graphical objects of the GUI shall be located, for example by using coordinates corresponding to the coordinates for describing the location of an object or contamination on the touch surface.

The processing unit 102 can receive coordinates describing the locations of graphical objects of the GUI and can, since the panel surface 104 uses a coordinate system corresponding to the coordinate system of the touch surface, associate objects of the GUI with touches on the touch surface 104.

A further example of introducing light into the panel 103 includes introducing the light in the form of a number of non-parallel beams where each beam can be swept or scanned along an incoupling site on the panel 103 such as the incoupling site 120x, and across the panel 103 by an input scanner arrangement (not shown). Such incoupling sites can be located at the left and top edges of the panel 103 and the transmitted energy at an outcoupling site on the panel can be measured by a detection arrangement which is arranged to receive the respective beam as it is swept across the panel 103. In this example, outcoupling sites are located at the right and bottom edges of the panel 103. Also, in alternative embodiments it is possible to arrange the emitters and detectors intermediate each other along the periphery of the panel. From this it follows that in- and outcoupling sites can be arranged at each edge of the panel.

It should be noted that still further examples of techniques that output data indicative of a location of an object on a touch surface can be used with the operations of the method described below. For purpose of describing such other techniques patent documents U.S. Pat. No. 4,254,333, U.S. Pat. No. 6,972,753, U.S. Pat. No. 7,432,893, US2006/0114237, US2007/0075648, WO2009048365, WO2010/006882, WO2010/006883, WO2010/006884, WO2010/006885, WO2010/006886 and International application No. PCT/SE2010/000135 are incorporated by reference, which documents describe various kinds of suitable incoupling and outcoupling of light as well as operations for obtaining one or more signals that are indicative of the spatial distribution of light in a light transmissive panel, and specifically signals that represent the light received at different spatial locations within one or more outcoupling sites. As the skilled person realizes, the invention is not limited to the specific embodiment described in connection with FIGS. 1 and 2.

Also, independent of the structure of the outcoupling site and incoupling site as well as independent of the exact configuration of the illumination and light detection arrangements, the illumination arrangement can operate in any suitable wavelength range, e.g. in the infrared or visible wavelength region. The light could be generated with identical wavelength as well as different for different emitters and detectors, permitting differentiation between emitters. Furthermore, the illumination arrangement can output either continuous or pulsed light.

The light can be generated by one or more light sources, which can be any type of device capable of emitting light in a desired wavelength range, for example a diode laser, a VCSEL (vertical-cavity surface-emitting laser), or alternatively an LED (light-emitting diode), an incandescent lamp, a halogen lamp, etc.

The energy of the light may be measured by any type of light detector capable of converting light into an electrical signal. Such a light detector may have any number of light-sensitive elements and may thus be a 0-dimensional, 1-dimensional (1D) or 2-dimensional (2D) detector. One detector may be used to measure the energy of a single beam or the individual energy of plural beams (depending on technique used for the incoupling and outcoupling of light). In certain embodiments, the detector may be a photo detector with only one light-sensitive element, which may have a large detection surface, resulting in low detection noise.

Figure 4:
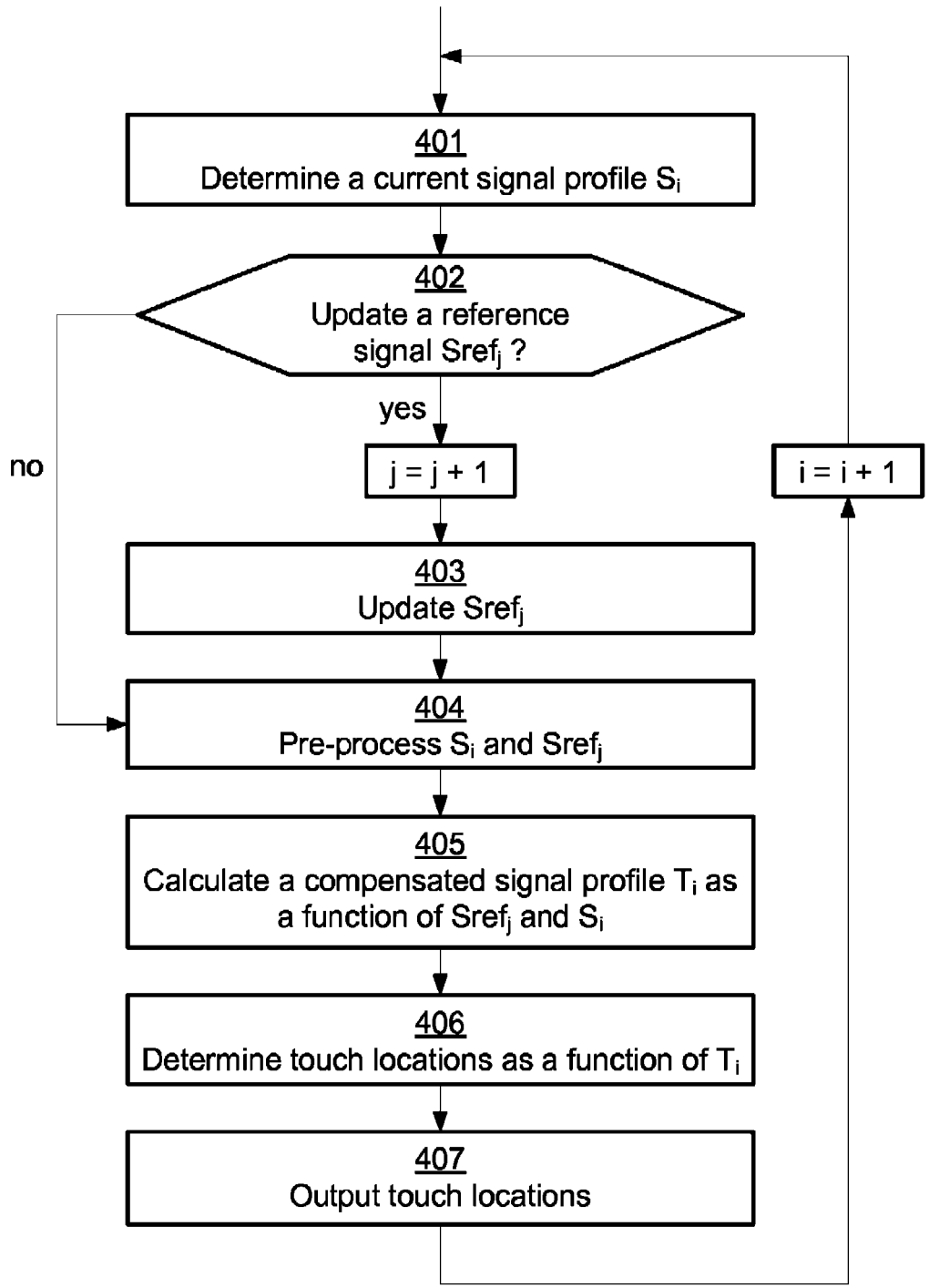
FIG. 4 is a flow diagram illustrating an embodiment of a method for determining a location of an object, performed by the apparatus of FIG. 1, FIGS. 5a-5b illustrate a background signal profile and a current signal profile of light received by a light detection arrangement.

With reference to FIG. 4 a flow diagram of a method for determining the location of the objects is illustrated, making use of the following definitions:

$S_i$: A measurement signal profile obtained by measuring the energy of light received at the outcoupling site(s) during iteration (sensing instance) no. i. $S_i$ may comprise $S_i$-x and $S_i$-y and can hence fully describe the location of an object. In the following the measurement signal profile is also denoted current signal profile. $S_i$ may comprise additional or other signal profiles than $S_i$-x and $S_i$-y, depending on what technology and principles are used for obtaining and representing the energy of light received at the outcoupling site(s). Such other signal profiles can be obtained if e.g. the technology described in WO2010/006882 is employed.

$Sref_j$: A background signal profile no. j obtained on basis on a measurement signal profile of the energy of light received at the outcoupling site during specific iterations (sensing instances). Sref, may comprise x-y components $Sref_r$-x and $Sref_r$-y, where $Sref_r$-x spatially corresponds to $S_i$-x and $Sref_r$-y spatially corresponds to $S_i$-y.

$T_i$: A transmission signal defined by $S_i/Sref_j$, taking contaminations into account for the determining of a location of an object.

The processing unit 102 may be configured to calculate the touch locations by performing a number of steps which make use of the light continuously introduced into the panel 103 and propagated by internal reflection between the touch surface 104 and the opposite surface 105. The method is iterative and is performed as long as the apparatus 101 is set in a mode for determining location of touches.

In step 401, a current signal profile $S_i$ is determined by acquiring measurement signals from the light detector(s) in the apparatus. Each measurement signal represents the energy transmitted through the panel by one or more beams (depending on incoupling and outcoupling technique used). Step 401 may involve mapping the measurement signals to spatial positions, which, depending on the specific technology used, may include converting any time-dependent measurement signal(s) into the panel coordinate system.

In step 402 it is determined if the background signal profile $Sref_j$ shall be updated, based on one or more criteria. Typically, if no background signal profile has been determined in previous iterations then the background signal profile shall be updated. More precisely, the first and any subsequent background signal profile can be determined by acquiring measurement signals from the light detector(s) in the apparatus.

Another criterion for determining if the background signal profile $Sref_j$ shall be updated may include determining if a predetermined time interval has passed since a previous updating of the background signal profile. By using a predetermined time interval the background signal profile can be regularly updated as a function of time, e.g. each iteration, every second minute or every 100'th iteration.

Still another criterion may include updating the background signal profile $Sref_j$ when no touches are present on the touch panel; since location of touches are regularly determined, as will be described in connection with step 406, inability of determining a touch location can be indicative of absence of objects and can accordingly be used as a criteria for updating the background signal profile.

In step 403 the background signal profile $Sref_j$ is updated which can include a number of operations as described below, either in combination or alone.

Typically, the background signal profile $Sref_j$ is updated by setting the background signal profile equal to the current signal profile $S_i$ when it is determined that no object touches the touch surface, i.e. when no location of an object can be determined (e.g. in step 406) or if no touch was present during the previous iteration.

Alternatively or additionally, the background signal profile $Sref_j$ can be determined during the manufacturing of the apparatus 101 when the touch surface is relatively free from contaminations and when no objects touches the touch surface. Again, in this case the background signal profile can be determined in the same manner as when determining the current signal profile $S_i$, i.e. by measuring the spatial distribution of light at the outcoupling site. Also, the background signal profile can be set to a current signal profile in response to a user initialization, for example as part of a reset-operation.

Another way of updating the background signal profile Sref, includes computing the background signal profile as the average spatial distribution of light at the outcoupling site measured over time. In this case the spatial distribution of light is measured at regular time intervals and the mean value, which often changes over the time as more contaminants are added to the panel, is calculated from the measured spatial distribution.

Also, a so called window function can be used where the background signal profile $Sref_j$ is computed as the average measured spatial distribution of light at the outcoupling site within a certain time interval, for example as the average spatial distribution measured within an interval from a current time to 10 seconds back in time.

An additional operation of updating the background signal profile includes updating the background signal profile as a function of the currently measured signal profile $S_i$ and a previously updated background signal profile $Sref_{j-1}$, for example by weighting the currently measured signal profile $S_i$ relatively lower than the previously updated background signal profile $Sref_{j-1}$. An example of this is illustrated by the following formula:

$$Sref_j = (1-\in) \cdot Sref_{j-1} + \in \cdot S_i \qquad (1)$$

where $0 <= \in < 1$. By selecting a lower value of $\in$ the current signal profile is given a relatively lower weight, which can e.g. reduce the effect of momentary disturbances since not all of the updated background signal profile then depends on a very latest measurement signal. By setting the $\in$-value to zero, it is possible to ensure that no signal resulting from a touch disturbs the background signal, which essentially corresponds to not updating the background signal. By selecting a higher value of $\in$ it is possible to achieve a faster update of the background signal, which is particularly relevant when it has been detected that a touch has disappeared.

Figure 5A:
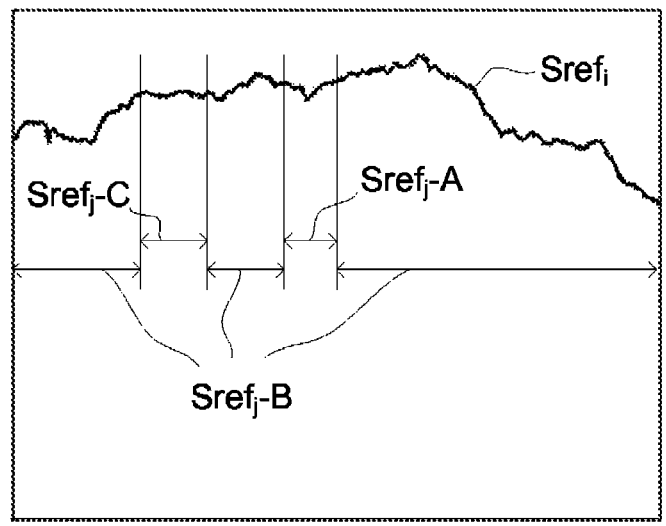
Figure 5B:
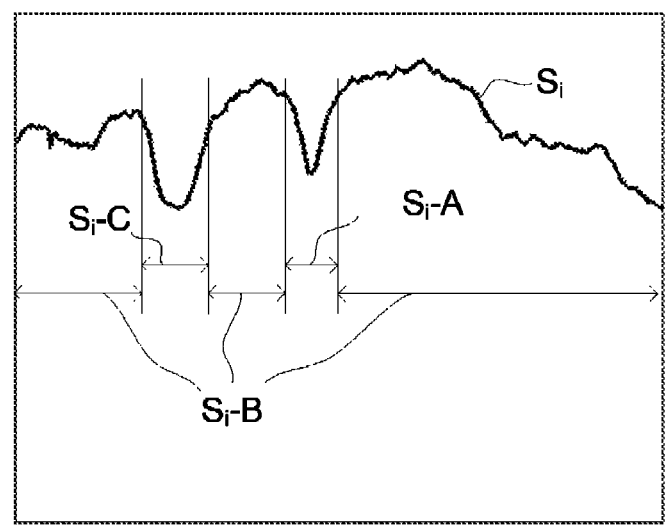

With reference to FIGS. 5*a* and 5*b* which illustrate a background signal profile $Sref_j$ and a current signal profile $S_i$ of light received by the light detection arrangement, another updating operation for the background signal profile $Sref_j$ includes updating a first section $Sref_j$-A of the background signal profile $Sref_j$ different from a second section $Sref_j$-B of the background signal profile $Sref_j$. The difference in updating of the sections $Sref_j$-A and $Sref_j$-B can be based on whether one of the sections $Sref_j$-A or $Sref_j$-B indicates a touch.

In more detail and as can be seen in FIG. 5*b*, section $Sref_j$-A as well as a further section $Sref_j$-C comprise a respective part of the signal profile $Sref_j$ with a reduced signal level that is typically indicative of a touch, as will be described in more detail below. Since the signal profiles $Sref_j$ and $S_i$ correspond to the same spatial distribution of light at the outcoupling site(s) of the panel, sections $Sref_j$-A and $Sref_j$-C can be identified by knowing the touch-indicating sections $S_i$-A and $S_i$-C. From this it follows that $Sref_j$-A and $Sref_j$-C can be referred to as sections spatially corresponding to touches. In a similar manner section $S_i$-B spatially corresponds to section $Sref_j$-B, which sections accordingly indicate parts of the signal profiles unaffected by any current touch on the panel. Hence, by knowing a location of a touch, section $Sref_j$-B can, for example, be updated while sections $Sref_j$-A and $Sref_j$-C are not updated as long as the corresponding touch is present.

An additional operation for updating the background signal profile $Sref_j$ includes updating, when a touch is removed from the touch surface, the section spatially corresponding to the removed touch faster than other sections of the background signal profile $Sref_j$. The faster updating is performed for a certain period of time from when the touch was removed.

In other words, as soon as a touch disappears from the panel the part of the background signal profile spatially corresponding to the touch is updated at a faster rate than other parts of the background signal profile. For example, when a touch is removed the associated part of the background signal profile can be updated every sensing instance for 40 subsequent sensing instances, while other parts of the background signal unaffected by the removed touch are updated every fifth sensing instance. By performing this operation, any signal contribution resulting from e.g. a fingerprint remaining on the location of the previous touch can be taken into account relatively fast. In cases when the background signal is updated every iteration it is possible to achieve the faster update by changing the temporal behavior of the update procedure, which can be achieved by e.g. increasing the value of c in formula (1).

It is also possible to update a section of the background signal different if that section spatially corresponds to a specific object of the GUI, such as a pictogram in the form of e.g. a computer icon.

A further updating operation includes updating the background signal profile as a function of time. For example, the background signal profile may be set to measurement values obtained at the outcoupling site at least 4 seconds back in time. Such an operation is practical since the background signal profile can be distorted by events that cannot be detected until after several sensing instances, and by using a delayed background signal profile the effect of these events can be compensated for before they reach the background signal profile used in subsequent operations for determining a location of an object.

The updating of the background signal profile can also be implemented as an integrated control system using either the current signal profile or a previous background signal profile as input. An example of such a control system can mathematically be described by the following formula where, for example, i=j, a is a time coefficient typically between 0.001 to 0.1 and where $Sref_x$ is typically set to an $Sref_j$-value between 1 and 50 sensing instances before entering a touch state:

$$Sref_{(j+1)} = \begin{cases} Sref_j + a \cdot (S_i - Sref_j), & \text{when } Sref_j \notin \text{touch state} \\ Sref_j + a \cdot (Sref_x - Sref_j), & \text{when } Sref_j \in \text{touch state} \end{cases} \quad (2)$$

It should be noted that $Sref_x$ is generally not updated after the touch state has been entered but it is a measure of how the background was before the touch state was entered.

Here, a "touch state" refers to a part of the background signal profile that spatially corresponds to a touch, i.e. when using the signal profiles of FIGS. 5a-b as an example, sections $Sref_j$-A and $Sref_j$-C discussed above indicate, or has entered, a touch state for the background signal profile. Correspondingly, section $Sref_j$-B has not entered a touch state and hence the part of the background signal profile that comprises $Sref_j$-B is updated in accordance with the first variant ($Sref_j \notin$ touch state) of formula (2), while the touch state parts ($Sref_j$-A and $Sref_j$-C) are updated in accordance with the second variant ($Sref_j \in$ touch state).

Immediately after a touch has appeared or disappeared coefficient a is generally set to a higher value, typically in the range from 0.01 to 1.0, in order to quickly adapt to a previous $Sref_j$-value or a new $S_i$-value.

A special situation when updating the background signal $Sref_j$ can occur when two or more touches give an aggregated decrease of the current signal profile $S_i$ due to their alignment along the same path of light in the panel. If one of the aligned touches is removed, the relevant part of the current signal profile $S_i$ still indicates a touch. However, at the same time the corresponding part of the background signal profile $Sref_j$ may need a faster update since fingerprints from the removed touch may remain on the touch surface. To handle this the corresponding part of the background signal profile $Sref_j$ can be updated at a higher rate than normally would be the case when a touch is present, for example by updating the relevant part by using the first variant of formula (2), but with a relatively smaller a-value. Another way of updating $Sref_j$ in the relevant parts where the touch has disappeared includes adding a fingerprint signal to the $Sref_x$ value. This addition can then cause the second variant of formula (2) to update the $Sref_j$-value to include the attenuation caused by the fingerprint. A typical fingerprint signal can be empirically determined by estimating a mean attenuation caused by a number of fingerprints. Another alternative includes setting the fingerprint signal to 2-15% of the signal level of the section of the current signal profile that indicated the touch that left the fingerprint. Of course, the fingerprint signal can be used in other operations for updating the background signal profile, for instance by adding the fingerprint signal directly to a previous background signal profile.

Detection of removal of one touch of several touches, where each touch is decreasing the signal level at same parts of the current signal profile, can be based on monitoring the level of signal changes for each touch-indicating section of the current signal profile. For example, if a signal change indicates a certain increased energy level at a touch-indicating section while the energy level at the section still is indicative of a touch, removal of one touch of several aligned touches is detected. Preferably, energy levels at the outcoupling site indicative of no, one, two, three (and so on) touches are empirically determined.

As mentioned above, the updating of the background signal profile can depend on whether an object touches the touch surface or not. Some alternatives for determining if an object is present on the surface includes i) successfully determining, during a previous iteration or sensing instance, a location of an object, ii) determining a quick change of a current signal profile and iii) determining a time-distributed ripple of the current signal profile.

For illustrating the two later alternatives ii) and iii) reference is made to FIG. 6 which is a graph over time-distributed attenuation of light measured at a touch, for example by an emitter/detector-pair. The attenuation can be determined at each sensing instance (time interval) as e.g. the average negative logarithm of the transmission signal within a section of the transmission signal that is indicative of a touch. The transmission signal is further elucidated below, and instead of an attenuation signal, the transmission signal per se, the current signal profile, the background signal profile or a raw signal of the light detectors may be used.

The determining of a quick change of a current signal profile is sometimes referred to as slope detection and includes measuring the change of a part of the time-distributed attenuation. If the change increases sharply it is considered to indicate a touch. In a similar manner, if the attenuation decreases sharply between sensing instances, it can be determined that a touch is removed.

Figure 6:
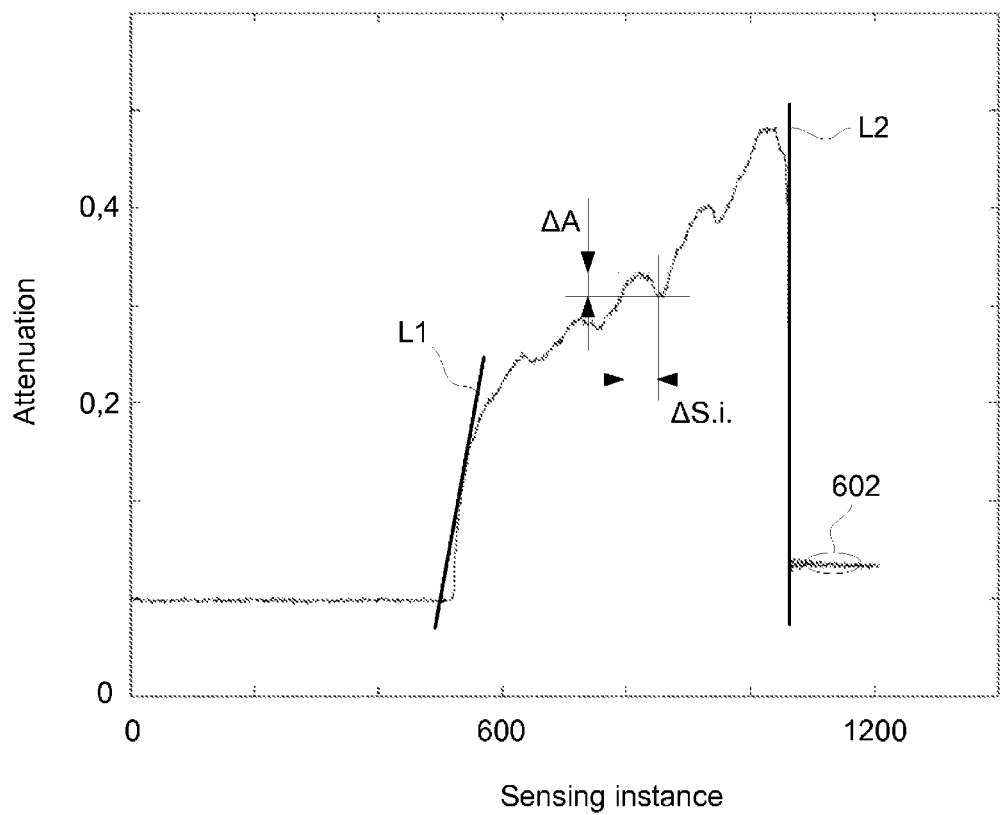
FIG. 6 illustrates time-distributed attenuation of light measured during a touch.

As can be seen in FIG. 6, there is a sharp increase of the attenuation within a short period of time, as indicated by line L1, and a sharp decrease of the attenuation, as indicated by L2. As mentioned, the attenuation is distributed over a number of sensing instances which corresponds to the attenuation being distributed over time. The amount of the change of the attenuation generally depends on the attenuation (light scattering/absorbing) properties of the touching object, on how hard the object is pressed on the panel and on the specific hardware components and materials used in the apparatus. The amount of change may be empirically determined for every type of touch sensing apparatus, e.g. by measuring the magnitude when touching/not touching the touch surface with various kinds of commonly used objects.

Determining a ripple of the signal profile may involve investigating specific parts of the time-distributed attenuation, namely those parts that indicate an increased attenuation of light. If the magnitude of the investigated part changes to a certain extent between sensing instances, i.e. if a ripple is present, the ripple is usually indicative of a touch initiated by a person or a robot, which is based on the understanding that persons as well as many robots rarely are completely still. Exactly how much ripple is indicative of a touch can be empirically determined.

An example of such a ripple is illustrated by FIG. 6 where a signal profile has a variation in attenuation $\Delta A$ over an interval of sensing instances $\Delta S.i$. The exact variation in attenuation $\Delta A$ can be empirically determined but is in any case larger than a small, general ripple resulting from signal noise often common in electronic measuring devices like the employed light detection arrangement. An example of a small ripple resulting from noise is indicated by section 602.

It should be noted that the two later alternatives ii) and iii), i.e. the determining of a quick change of a signal profile and the determining of a time-distributed ripple of a signal profile, can be used in other touch-sensing applications for identifying presence of a touch and/or the location of the touch. Accordingly, these alternatives are not limited to the apparatus and method described herein. Since both alternatives rely on the time distribution of light (at an outcoupling site) for identifying presence and/or a location of a touch, a general method applicable in connection with other touch-sensitive apparatuses comprises determining a presence and/or a location of a touch as a function of the time distributed variation of light received at an outcoupling site. The alternatives ii) and iii) are more detailed embodiments of the general method and can be used in combination. The general method can also be used for verifying whether an existing method appears to correctly identify the presence/location of a touch. As indicated, the general method can use a raw signal of the light detectors as input or any other signal profile derived from the raw signal, and the general method can be applied on e.g. the techniques described in the previously incorporated patent documents.

Referring now to the method in FIG. 4, in step 404 the current signal profile $S_i$ and optionally the background signal profile $Sref_j$ are pre-processed. For example, the signal profiles may be processed for noise reduction using standard filtering techniques, e.g. low-pass filtering, median filters, Fourier-plane filters, etc. Furthermore, if the energy of the emitted light is measured in the apparatus, the signal profiles may be compensated for temporal energy fluctuations in the illumination arrangement. Furthermore, the signal profiles may contain sensor readings from outside the region of interest, e.g. outside a sensing area of the panel. Thus, the signal profiles may be pre-processed by extracting relevant parts thereof. Furthermore, the signals may be rectified, i.e. converted to have equidistant sampling distance in the panel coordinate system. Such a rectification may include interpolating each measurement signal with a non-linear angle variable, resulting in a data set with samples that are evenly distributed over the panel.

Figure 7A:
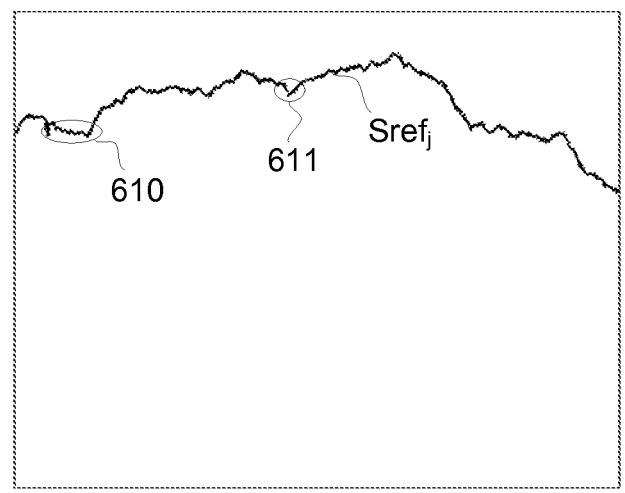
FIGS. 7a-7d illustrate a background signal profile, a current signal profile, calculated transmission and the negative logarithm of the transmission during multiple touches on the apparatus of FIG. 1.

In step 405 a compensated signal profile in the form of a transmission signal $T_i$ is calculated where $T_i=S_i/Sref_j$ or, using a different but equivalent expression, $\log(T_i)=\log(S_i)-\log(Sref_j)$ With reference to FIG. 7a an example of a background signal profile $Sref_j$ is illustrated, where energy of light received at an outcoupling site (vertical axis) is plotted as a function of a spatial signal distribution (horizontal axis). In other words, the background signal profile can be given as a plot of transmitted energy as a function of position within the outcoupling site. Contaminations present on a touch panel can cause reductions of light at the outcoupling site, such as reductions 610, 611.

Figure 7B:
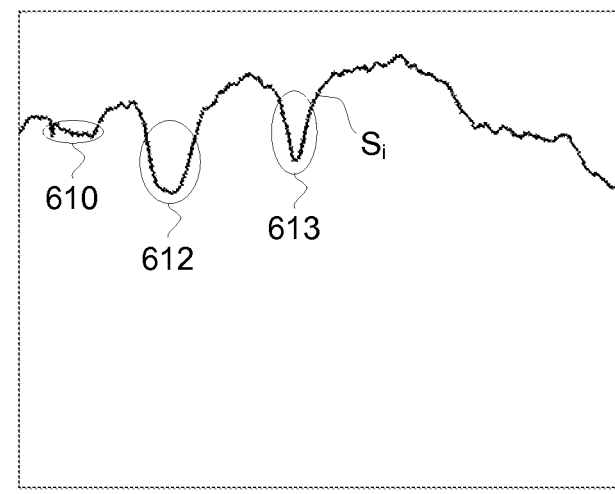

A current signal profile $S_i$ obtained when three objects touch the panel 103 is exemplified in FIG. 7b, where measured signal levels are significantly lower at points 612, 613 corresponding to the touches. However, as can be seen reductions of light due to contaminations is still included in the signal profile, as shown by reduction 610.

Figure 7C:
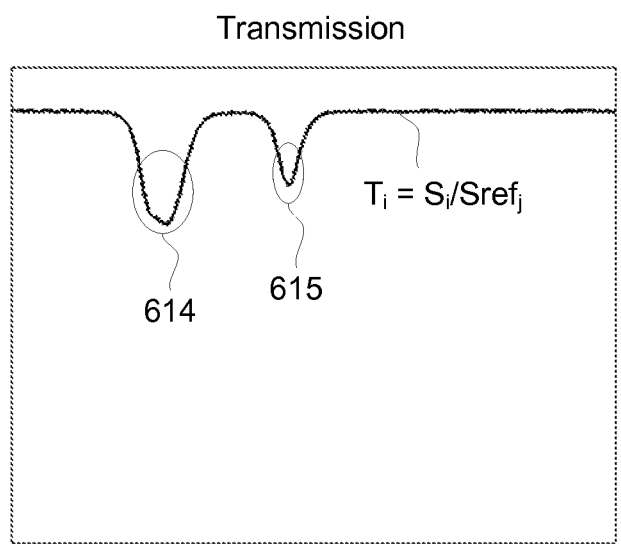

When dividing the current signal profile $S_i$ with the background signal profile $Sref_j$ the transmission signal $T_i$ is obtained having a transmission distribution as illustrated by FIG. 7c. Here, the sections 614, 615 of the transmission $T_i$ that indicate the touches show a reduction in transmission. The transmission signal results in an essentially uniform signal level at a (relative) transmission of about 1 with the sections 614, 615 caused by the touching objects. It is to be understood that the conversion of measurement signals into transmission signals greatly facilitates the identification of relevant sections indicative of touches. It also makes it possible to compare sections in measurement signals obtained at different outcoupling sites and/or for different beams propagating in the panel.

If there are more than one touch aligned in the direction of the light travelling towards the outcoupling site, the total transmission signal given by the touches is the product of individual transmissions of the touches. In FIG. 7c, section 614 typically represents two touches while section 615 represents one touch.

Figure 7D:
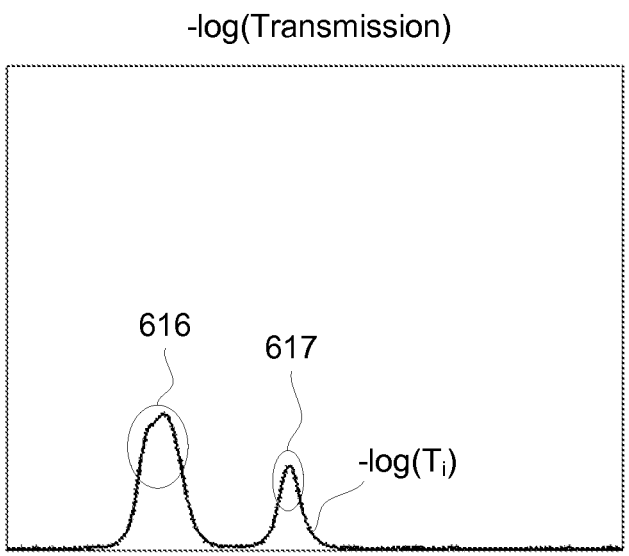

Since logarithmic operations are advantageously used, and since it is often more illustrative to indicate a touch as a positive signal, the negative logarithm $(-\log(T_i))$ of $T_i$ can be determined which renders a signal profile like the profile of FIG. 7d, where peak 616 corresponds to section 614 while peak 617 corresponds to section 615.

Since the transmission signal compensates for e.g. contaminations as well as for any other light absorbing defects of the touch panel, the transmission signal is considered to be a "compensated" signal.

It is to be noted that the signal profiles of FIGS. 7a-7d can represent the spatial distribution of light in one of the x- and y-directions in the panel. As the skilled person realizes, if each of the x- and y-position of a touch is to be determined, operations on several signal profiles must be performed. However, it is also possible to generate and operate on an aggregated signal profile that represents the full spatial distribution of light in the panel.

Referring now to the method in FIG. 4, in step 406, the touch locations are determined based on the transmission signal, optionally also on basis on transmission signals calculated during previous iterations. In brief, location of touches can be determined on basis of a change in transmission over a number of sensing instances.

The magnitude of the sections 614, 615 in FIG. 7c as well as the magnitude of the peaks 616, 617 in FIG. 7d indicate touch locations. Also, the size of an area value indicative of the integrated area e.g. under each of the peaks 616, 617 can indicate touch locations, and a priori knowledge about the touch locations, for example by using information about the touch locations that were identified during preceding sensing instances, can be used for increasing the accuracy and/or computation speed of the determination of touch locations.

Moreover, the touch-sensing apparatus described herein may be modeled to use any suitable known algorithm developed for transmission tomography. Thus, the touch locations may be reconstructed using any available image reconstruction algorithm such as few-view algorithms. The reconstruction may also take into account a predetermined functional dependence between signal width and position along the touch panel, caused by scattering in the apparatus.

From the examples above, it is clear that knowing the location of a touch can be relevant in some cases of the updating of the background signal profile. For this purpose the extent of the part of the background signal profile (e.g. section $Sref_j$-A of FIG. 5a) that spatially corresponds to a touch is stored in the memory of the touch-sensing apparatus. As long as the touch is present on the panel, it is possible to deter from updating the touch indicating section of the background signal profile.

By deterring from updating touch-indicating sections of the background signal profile, e.g. the signal profile of the negative logarithm of $T_i$ will maintain the touch-indicating peaks.

On the other hand, if the full background signal profile is updated by setting the background signal to e.g. the current measurement signal profile or an average, weighted average etc. thereof, then the touch-indicating peaks of the negative logarithm of $T_i$ will diminish over the time since $T_i=S_i/Sref_j$, having in mind that both $S_i$ and $Sref_j$ after some time will include corresponding signal levels at points indicating touches. In this case, once a touch is first detected, information about the location of the touch is stored in the memory of the touch-sensing apparatus for identifying the touch over the time. Once the touch is removed from the panel, transmission will increase at the location of the removed touch and the transmission signal (compare FIG. 7c) will exhibit a peak at the removed touch. When a touch is removed, the associated touch-indication information in the memory is disregarded as the touch is not longer valid.

In step 407 the determined touch locations are outputted and the method returns to step 401 for processing of a next sensing instance.

Figure 8:
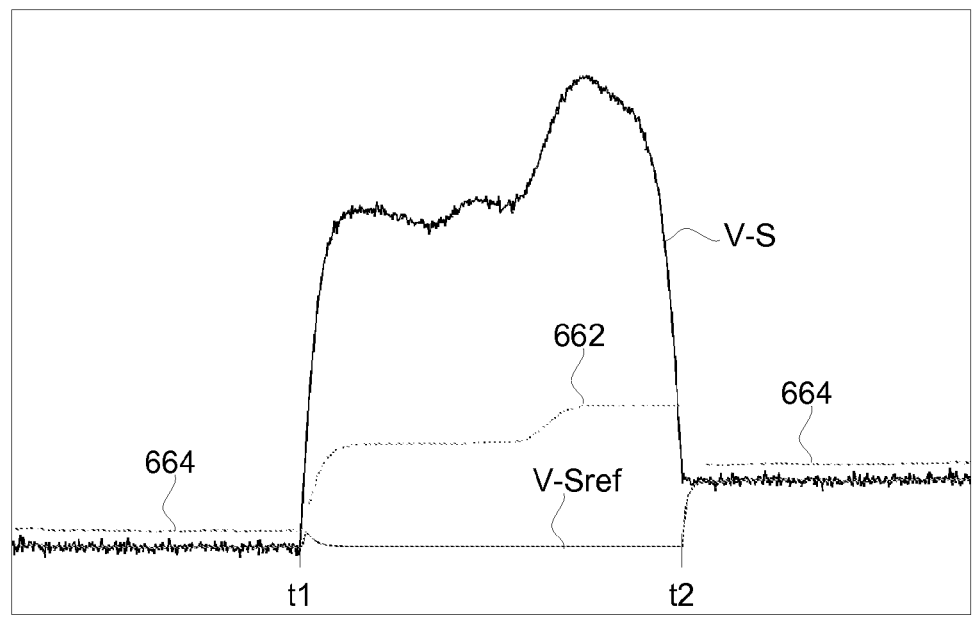
FIG. 8 illustrates time-distributed values of a current signal profile and a background signal profile, and some related threshold levels.

For illustrating how the background signal profile $Sref_j$ may vary over time reference is made to FIG. 8. Here, a time distributed attenuation value V-S of the current signal profile $S_i$ represents attenuation at a specific part of the outcoupling site. A corresponding time distributed attenuation value V-Sref of the background signal profile $Sref_j$ is also shown. As is known, attenuation indicates a touch as an increase in signal level while e.g. a raw signal from a sensor indicates a touch as a decrease in signal level.

The V-S value and the V-Sref value have roughly the same attenuation levels in the beginning. At this point, any small difference in attenuation may typically be caused by the background signal profile being low-pass filtered while the current signal profile is not.

At a certain point t1 in time the V-S value increases sharply which typically corresponds to an object touching the panel. The V-Sref value increases at the very same time t1, assuming the background signal profile is updated with a method that uses the current signal profile. Since the V-S value increases above a certain level illustrated by curve 664, it can be determined that an object touches the screen. The increase of the V-Sref value due to the touch at time t1 can be remedied by setting it to a value it had at a moment prior to time t1. A threshold level illustrated by curve 662 can be used for determining when the touch is no longer present, i.e. when the V-S value falls below the threshold level 662 at point t2 in time, it can be determined that the touch is no longer present. The threshold level 662 can be set to e.g. 30% of the maximum V-S value measured a number of sensing instances back in time.

As long as the object touches the screen, the V-Sref value is not updated, but as soon as the touch disappears at time t2 the V-Sref value is updated by taking the current V-S value into account, such that the V-Sref value then has essentially the same signal level as the V-S value. The increased signal levels (attenuation) after the time t2 in comparison with the signal levels prior to time t1 are typically caused by contamination in form of a fingerprint remaining on the location of the previous touch. After time t2 the certain level 664 is updated by an amount that corresponds to the difference in signal level for the V-S value after and prior the touch.

Figure 9A:
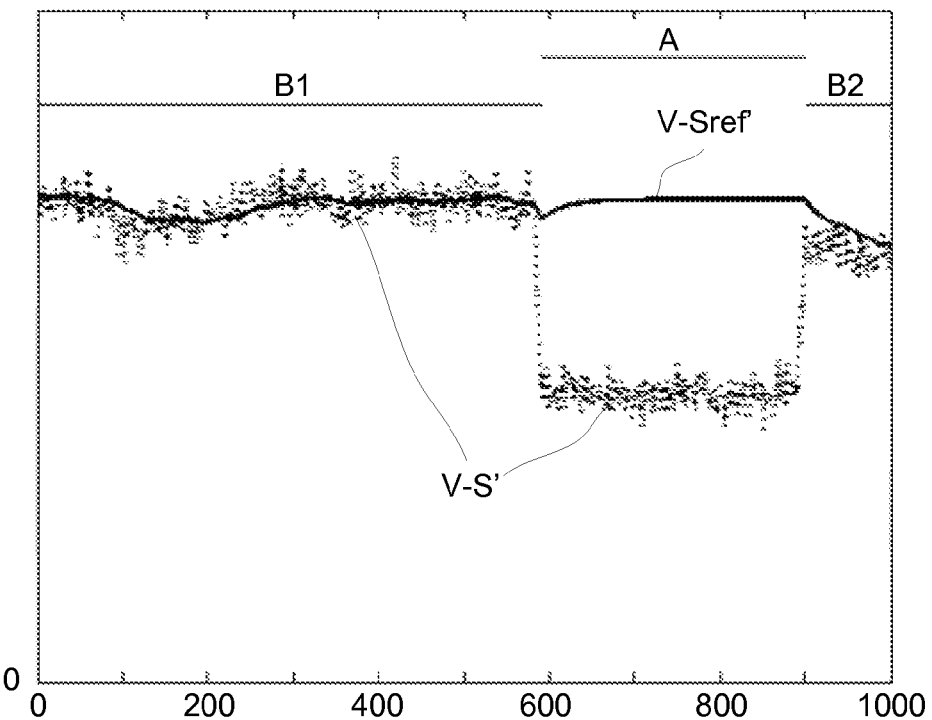
FIGS. 9a-9c illustrate time-distributed values of a current signal profile, background signal profile and calculated attenuation, in accordance with some principles described herein.
Figure 9B:
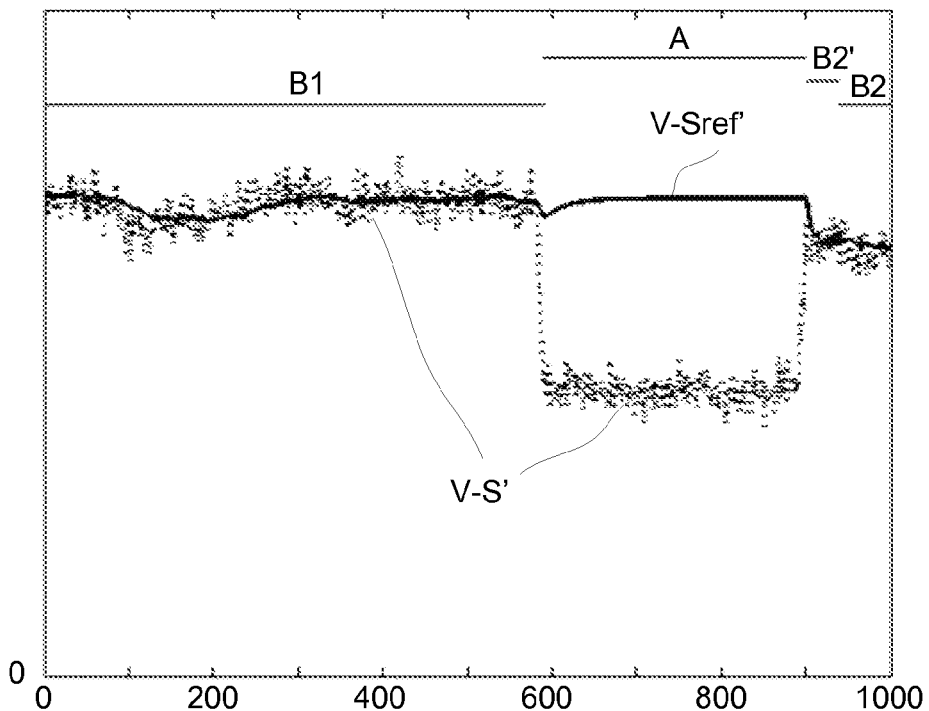
Figure 9C:
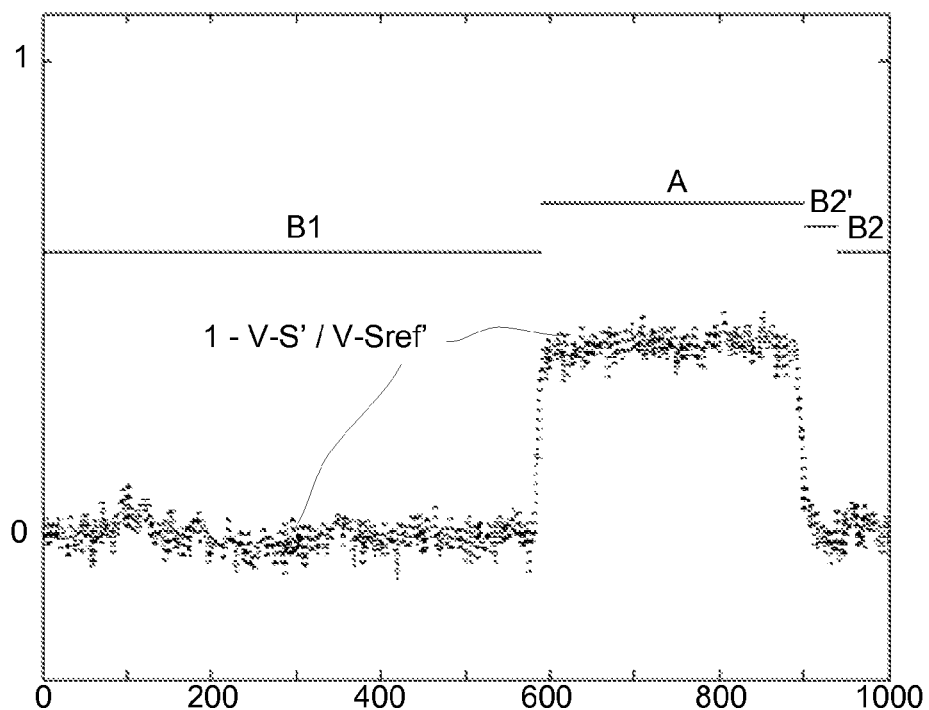

With reference to FIGS. 9a-c results of some calculations described above are illustrated in further detail.

FIG. 9a shows a time distributed signal value V-S' of a current signal profile $S_i$ and a time distributed signal value V-Sref' of a background signal profile $Sref_j$ as measured respectively updated over 1000 sensing instances for a specific part of the outcoupling site. The V-S' value is here a raw signal level obtained from the light detection arrangement and exhibits some noise, as be seen by the variance in measurement points covered by section B1. Measurement points covered by section A indicate a touch by a finger, and measurement points covered by section B2 have a reduced signal level in comparison with the measurement points covered by section B1, which is the typical effect of a fingerprint caused by the touch of the finger. The V-S' value is not updated during the sensing instances covered by section A, except for a small reset performed directly after the touch has appeared.

FIG. 9b corresponds to FIG. 9a but with the difference of a faster update of the reference signal after the touch has disappeared. The faster update is performed for at sensing instances covered by section B2'. Normal update is performed at sensing instances covered by section B2. As can be seen, here the V-Sref' value reflects the V-S' value faster than in FIG. 9a, which allows the effect of the fingerprint to be taken into account at an earlier stage.

FIG. 9c exemplifies a time distributed value of a compensated signal profile that has been calculated as 1−V-S'/V-Sref', where V-S' and V-Sref' are the values of FIG. 9b. As can be seen, the signal levels of sections B2 and B2' basically correspond to the signal level of section B1, even though a fingerprint is present at the location of the former touch. However, the signal level at sections B2 and B2' would have been significantly higher if the background signal profile were not updated as described.

Although various embodiments of the invention have been described and shown, the invention is not restricted thereto, but may also be embodied in other ways within the scope of the subject-matter defined by the claims. In particular, the invention may be implemented by using other techniques for obtaining a signal profile indicative of a distribution of light within a panel.

The invention claimed is:

1. An apparatus for determining a location of at least one object on a touch surface, the apparatus comprising:
a light transmissive panel defining the touch surface and an opposite surface;
an illumination arrangement configured to introduce light into the light transmissive panel for propagation by internal reflection between the touch surface and the opposite surface;
a light detection arrangement configured to receive the light propagating in the light transmissive panel; and
a processor unit configured to iteratively,
determine a current signal profile of light received by the light detection arrangement,
update, when a condition is met, a background signal profile of light received by the light detection arrangement,
calculate a current compensated signal profile as a function of the background signal profile and the current signal profile, and
determine, when the at least one object touches the touch surface and thereby attenuates the light propagating in the light transmissive panel, the location as a function of the current compensated signal profile.

2. The apparatus according to claim 1, wherein the processor unit is configured to calculate the current compensated signal profile by dividing the current signal profile with the background signal profile.

3. The apparatus according to claim 1, wherein the processor unit is configured to calculate the current compensated signal profile by subtracting a logarithm of the background signal profile from a logarithm of the current signal profile.

4. The apparatus according to claim 1, wherein the processor unit is configured to calculate the current compensated signal profile by subtracting the background signal profile from the current signal profile.

5. The apparatus according to claim 1, wherein the processor unit is configured to determine the location by subtracting a previously determined compensated signal profile from the current compensated signal profile.

6. The apparatus according to claim 1, wherein each of the signal profiles includes a respective signal profile of a first main direction of the light transmissive panel and a respective signal profile of a second main direction of the light transmissive panel.

7. The apparatus according to claim 1, wherein:
the illumination arrangement includes a set of light emitters for introducing the light;
the light detection arrangement includes a set of light detectors for receiving the light; and
the light for forming the background signal profile and the light for forming the current signal profile are introduced and received at a respective time by the same sets of light emitters and light detectors.

8. The apparatus according to claim 1, wherein the processor unit is configured to update the background signal profile independent of a presence of the at least one object on the touch surface.

9. The apparatus according to claim 1, wherein the processor unit is configured to update the background signal profile when the at least one object touches the touch surface, and thereby attenuates the light propagating in the light transmissive panel.

10. The apparatus according to claim 1, wherein the processor unit is configured to update the background signal profile when the apparatus is initiated.

11. The apparatus according to claim 1, wherein the processor unit is configured to update the background signal profile at predetermined time intervals.

12. The apparatus according to claim 1, wherein the processor unit is configured to update the background signal profile when the processor unit determines that the at least one object does not touch the touch surface.

13. The apparatus according to claim 1, wherein the processor unit is configured to update the background signal profile as a function of a currently measured signal profile and a previously updated background signal profile.

14. The apparatus according to claim 1, wherein the processor unit is configured to update the background signal profile by weighting a currently measured signal profile relatively lower than a previously updated background signal profile.

15. The apparatus according to claim 1, wherein the processor unit is configured to update a first section of the background signal profile different from a second section of the background signal profile.

16. The apparatus according to claim 1, wherein the processor unit is configured to update a first section of the background signal profile indicative of the location of the at least one object different from a second section of the background signal profile not indicative of the location of the at least one object.

17. The apparatus according to claim 1, wherein the processor unit is configured to update the background signal profile by determining the background signal profile as a function of the location of the at least one object.

18. The apparatus according to claim 1, wherein the processor unit is configured to update the background signal profile by determining the background signal profile as a function of time passed since the location of the at least one object was determined.

19. The apparatus according to claim 1, wherein the processor unit is configured to, when the at least one object is removed from the touch surface, update a first section of the background signal profile associated with the location of the at least one object faster than a second section of the background signal profile not associated with the location of the at least one object.

20. The apparatus according to claim 1, wherein the processor unit is configured to update the background signal profile as a function of a time-distributed variation of light received by the light detection arrangement.

21. The apparatus according to claim 1, wherein the processor unit is configured to update the background signal profile as a function of the location of the at least one object determined over a specific time interval.

22. The apparatus according to claim 1, further comprising:
a memory unit configured to store data indicative of the presence of the at least one object on the touch surface, wherein
the processor unit is configured to update the background signal profile as a function of the presence of the at least one object.

23. The apparatus according to claim 1, wherein the processor unit is further configured to determine the location of the at least one object as a function of a previously determined compensated signal profile.

24. The apparatus according to claim 1, further comprising:
an interface device providing a graphical user interface aligned with the light transmissive panel, wherein
the processor unit is configured to update the background signal profile as a function of the graphical user interface.

25. A method for determining a location of at least one object on a touch surface of a light transmissive panel defining the touch surface and an opposite surface, the method comprising the steps of iteratively:
determining a current signal profile of light received by a light detection arrangement after propagation in the light transmissive panel by internal reflection between the touch surface and the opposite surface;
updating, when a condition is met, a background signal profile of light received by the light detection arrangement;
calculating a current compensated signal profile as a function of the background signal profile and the current signal profile; and
determining, when the at least one object touches the touch surface and thereby attenuates the light propagating in the light transmissive panel, the location as a function of the current compensated signal profile.

26. A non-transitory computer-readable medium storing processing instructions that, when executed by a processing unit, cause the processing unit to perform a method for determining a location of at least one object on a touch surface of a light transmissive panel defining the touch surface and an opposite surface, the method comprising:
determining a current signal profile of light received by a light detection arrangement after propagation in the light transmissive panel by internal reflection between the touch surface and the opposite surface;
updating, when a condition is met, a background signal profile of light received by the light detection arrangement;
calculating a current compensated signal profile as a function of the background signal profile and the current signal profile; and
determining, when the at least one object touches the touch surface and thereby attenuates the light propagating in the light transmissive panel, the location as a function of the current compensated signal profile.

* * * * *